US012626560B2

(12) United States Patent
Grabiec et al.

(10) Patent No.: US 12,626,560 B2
(45) Date of Patent: May 12, 2026

(54) GAME STATE RESET FEATURE FOR GAMING MACHINE FAULT

(71) Applicant: LNW Gaming, Inc., Las Vegas, NV (US)

(72) Inventors: Jacek Grabiec, Chicago, IL (US); Anandkumar Singh, Henderson, NV (US); Vignesh Kumar Krishnamoorthy, Chennai (IN); Vijayakumar Balasubramanian, Chennai (IN)

(73) Assignee: LNW Gaming, Inc., Las Vegas, NV (US)

( * ) Notice: Subject to any disclaimer, the term of this patent is extended or adjusted under 35 U.S.C. 154(b) by 336 days.

(21) Appl. No.: 18/540,383

(22) Filed: Dec. 14, 2023

(65) Prior Publication Data

US 2024/0203199 A1 Jun. 20, 2024

Related U.S. Application Data

(60) Provisional application No. 63/433,283, filed on Dec. 16, 2022.

(51) Int. Cl.
*G07F 17/32* (2006.01)

(52) U.S. Cl.
CPC ...... *G07F 17/3227* (2013.01); *G07F 17/3234* (2013.01)

(58) Field of Classification Search
CPC ............. G07F 17/3234; G07F 17/3241; G07F 17/3227
See application file for complete search history.

(56) References Cited

U.S. PATENT DOCUMENTS

| | | | | |
|---|---|---|---|---|
| 6,517,433 | B2 | 2/2003 | Loose et al. | |
| 7,452,276 | B2 | 11/2008 | Loose et al. | |
| 7,654,899 | B2 | 2/2010 | Durham et al. | |
| 8,057,303 | B2 | 11/2011 | Rasmussen et al. | |
| 8,226,459 | B2 | 7/2012 | Barrett et al. | |
| 8,591,330 | B2 | 11/2013 | Kelly et al. | |
| 2006/0068867 | A1* | 3/2006 | White | G06Q 50/34 463/13 |
| 2007/0011427 | A1* | 1/2007 | Nelson | G07F 17/32 711/170 |
| 2007/0207854 | A1* | 9/2007 | Wolf | G07F 17/3202 463/24 |
| 2008/0171593 | A1* | 7/2008 | Haga | G07F 17/3234 463/43 |

* cited by examiner

*Primary Examiner* — Robert E Mosser

(57) ABSTRACT

A system and method(s) to perform operations for storing gaming data in a non-volatile random-access memory (NVRAM) of a gaming machine and detecting, after the storing, an unrecoverable fault of the gaming machine. The operations further include determining, in response to detecting the unrecoverable fault, that criteria is satisfied for authorization of a partial deletion of the gaming data from the NVRAM. The operations further include determining, in response to determining that the criteria is satisfied, a first portion of the gaming data to retain on the NVRAM, and deleting, after determining the first portion of the gaming data to retain, a second portion of the gaming data without deleting the first portion of the gaming data. The operations can further include booting a game of the gaming machine to a default operational state using at least some of the first portion of the gaming data.

18 Claims, 9 Drawing Sheets

GAME STATE RESET FEATURE FOR GAMING MACHINE FAULT

RELATED APPLICATIONS

This patent application claims priority benefit to U.S. Provisional Patent Application No. 63/433,283 filed Dec. 16, 2022. The 63/433,283 Application is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023, LNW Gaming, Inc.

FIELD

The present invention relates generally to apparatus and methods for gaming machine configuration and reset due to fault conditions.

BACKGROUND

Currently, if a fault occurs on a gaming machine (e.g., via a bug in the code, via a power surge, via a random error, etc.), to recover the gaming machine from the fault an operator must perform, according to current gaming industry procedures, a time-intensive manual process. During this process, if the gaming machine is in an unrecoverable fault state, an operator attendant must access a physical cabinet of the gaming machine and clear (i.e., erase) an entire non-volatile random-access memory (NVRAM) associated with the gaming machine. Further, the attendant reconfigures (e.g., rewrites) the entire gaming machine NVRAM to a default operational state, which full rewrite and reconfiguration process can be lengthy (e.g., well over 15 minutes). Furthermore, during the current fault-condition recovery procedure, an attendant performs various interactions with a patron (e.g., regarding potential disputes and/or payments), as well as with any security staff and/or equipment to determine whether the patron had made a bet on the interrupted game and to determine or verify the physical amount of the bet (e.g., via monitoring of video cameras, etc.). Furthermore, the attendant must interact with any regulatory entity that is present (e.g., in the case of some jurisdictions that require it) to monitor the repayment and/or accounting procedures of the restored machine. Furthermore, in cases of a patron dispute, a patron must also await the slow fault-recovery procedure as part of the dispute resolution process.

Thus, current fault-condition recovery procedures are extensive in their levels of manual data erasure, and intensive regarding physical interactions with people and/or machine hardware. This time-consuming process results in the gaming machine being kept out of commission for a significant amount of time while the machine is being recovered from the unrecoverable fault state. This prevents the gaming machine from being used for gaming purposes.

It would be beneficial for an innovation that can quickly and easily recover a gaming machine from a fault condition to an operable condition, and which avoids the challenges associated with the current fault-condition recovery procedures.

SUMMARY

According to an embodiment of the present disclosure, a system and/or method(s) to perform operations for storing gaming data in a non-volatile random-access memory (NVRAM) of a gaming machine and detecting, after the storing, an unrecoverable fault of the gaming machine. The operations further include determining, in response to detecting the unrecoverable fault, that criteria are satisfied for authorization of a partial deletion of the gaming data from the NVRAM. The operations further include determining, in response to determining that the criteria are satisfied, a first portion of the gaming data to retain on the NVRAM, and deleting, after determining the first portion of the gaming data to retain, a second portion of the gaming data without deleting the first portion of the gaming data. The operations can further include booting a game of the gaming machine to a default operational state using at least some of the first portion of the gaming data.

Additional aspects of the invention will be apparent to those of ordinary skill in the art in view of the detailed description of various embodiments, which is made with reference to the drawings, a brief description of which is provided below.

Figure 1:
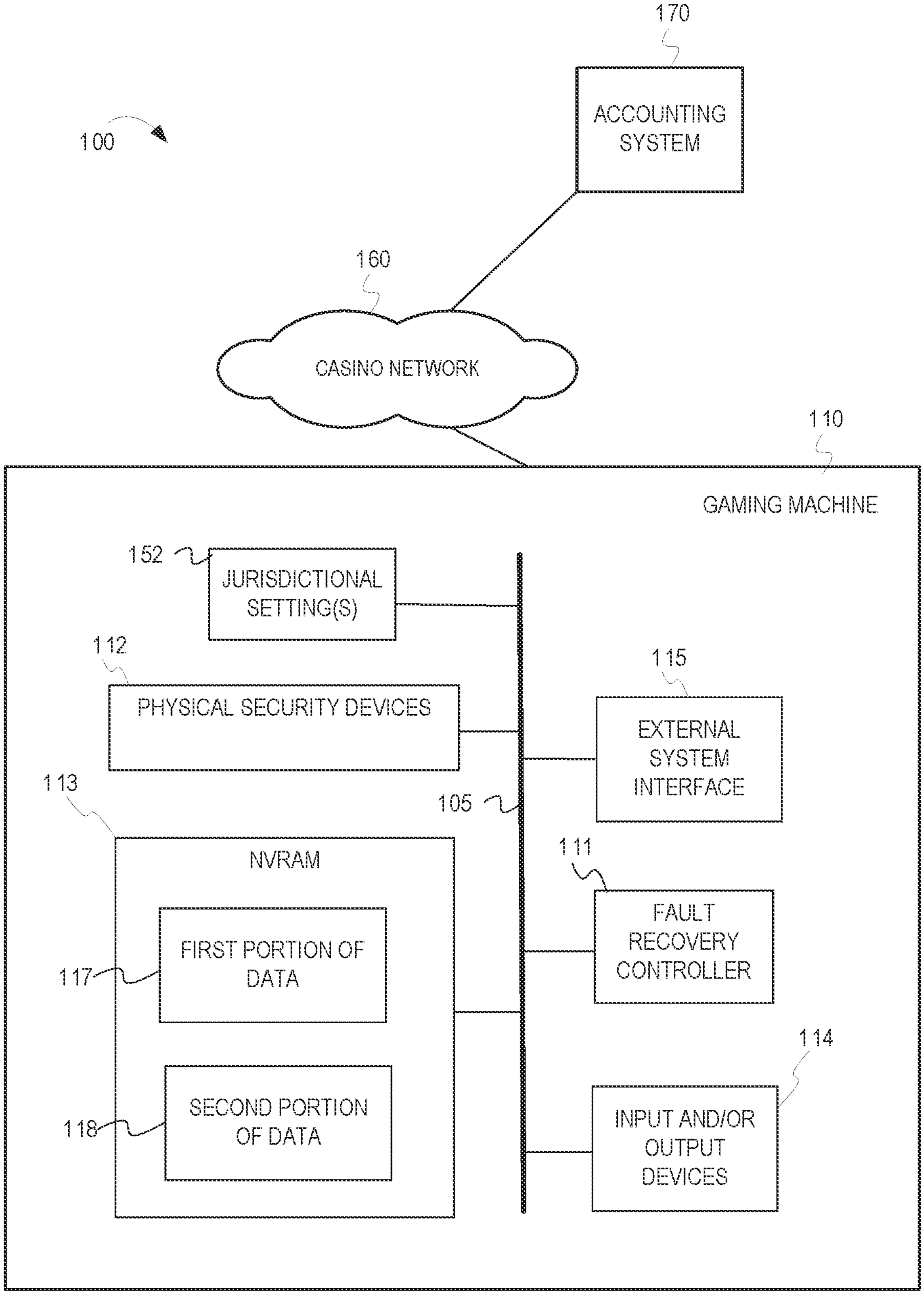
FIG. 1 is a diagram of an example network according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings, and will herein be described in detail, at least some embodiments with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

FIG. 1 is a diagram of an example network ("network 100") according to one or more embodiments of the present disclosure. The network 100 includes a gaming machine 110 connected to an accounting system 170 communicatively coupled (e.g., connected within the network 100) to each other via a casino network 160. In one example, the gaming machine 110 may be gaming machine 710 described in FIG. 7 or gaming machine 810 described in FIG. 8

The gaming machine 110 includes (but is not limited to) a fault recovery controller 111, physical security devices 112, a non-volatile random-access memory (NVRAM 113), input and/or output devices 114 (e.g., display 401, primary presentation device 718, secondary presentation device 720, etc.) and an external system interface 115 (e.g., see also external system interface 858), connected via a bus 105. The NVRAM 113 includes a first portion of NVRAM data (first portion of data 117) that is not for a current game state of the gaming machine 110. The first portion of data 117 includes configuration data for the gaming machine 110 as well as information about credits (e.g., accounting information), game play history, events, etc. associated with game play cycles that have occurred prior to the game cycle for the most recent (i.e., last played) game cycle in which the fault occurred. The configuration data, from the first portion of data 117, is data that allows the gaming machine to function, such as configuration settings, installation instructions, etc. The game play history, events, accounting data, etc., are data that can be used for reference, audit, etc. for the gaming machine 110. In some embodiments, the first portion of data 117 may be specifically authorized for potential retention according to a jurisdictional setting (e.g., a limit, restriction, rule, etc.) related to the gaming machine 110. For example, the first portion of data 117 may be authorized according to jurisdictional setting(s) 152 stored on the gaming machine 110. The jurisdictional setting(s) 152 may specify one or more jurisdictional rules related to a geographic location of the gaming machine 110. In some embodiments, the jurisdictional setting(s) 152 may specify (according to the one or more jurisdictional rules) one or more categories or types of data authorized for retention.

The fault recovery controller 111 tracks and categorizes the first portion of data 117 in a logical fashion (e.g., into specific file folders, with specific labels or tags, etc.). For example, initial configuration data may be stored in a specific file folder and/or data files may be named with a specific identifier which can be read, searched, sorted, etc. for selective retention. The fault recovery controller 111 further stores a second portion of data 118, which includes gaming data related to a game state of a current game cycle that caused the fault, which can be selectively erased from the NVRAM 113 (e.g., via a game state reset feature, see FIG. 2 for further details).

In some embodiments, the fault recovery controller 111 provides an option to perform either a full reset (e.g., a complete erasure of the NVRAM 113) or a game state reset (e.g., a partial erasure of the NVRAM 113, which erases the second portion of data 118 and retains the first portion of data 117). The fault recovery controller 111 can provide the option in response to determining that certain criteria is/are satisfied, such as, but not limited to, one or more of the following: whether the jurisdictional setting(s) 152 authorize input and/or output devices 114, whether accounting meters of the gaming machine are in a balanced state, whether a logic box door is securely accessed (e.g., in an open state), etc. In addition, the fault recovery controller 111 can increment specific meters of the gaming machine 110 in response to performance of the game state reset. Furthermore, the fault recovery controller 111 stores one or more event records of the game state reset and presents notifications related to occurrence of the game state reset (e.g., notifications to an attendant about the fault, screen notifications related to a wager amount of an unfinished game, notifications sent to the accounting system 170, etc.).

Figure 2:
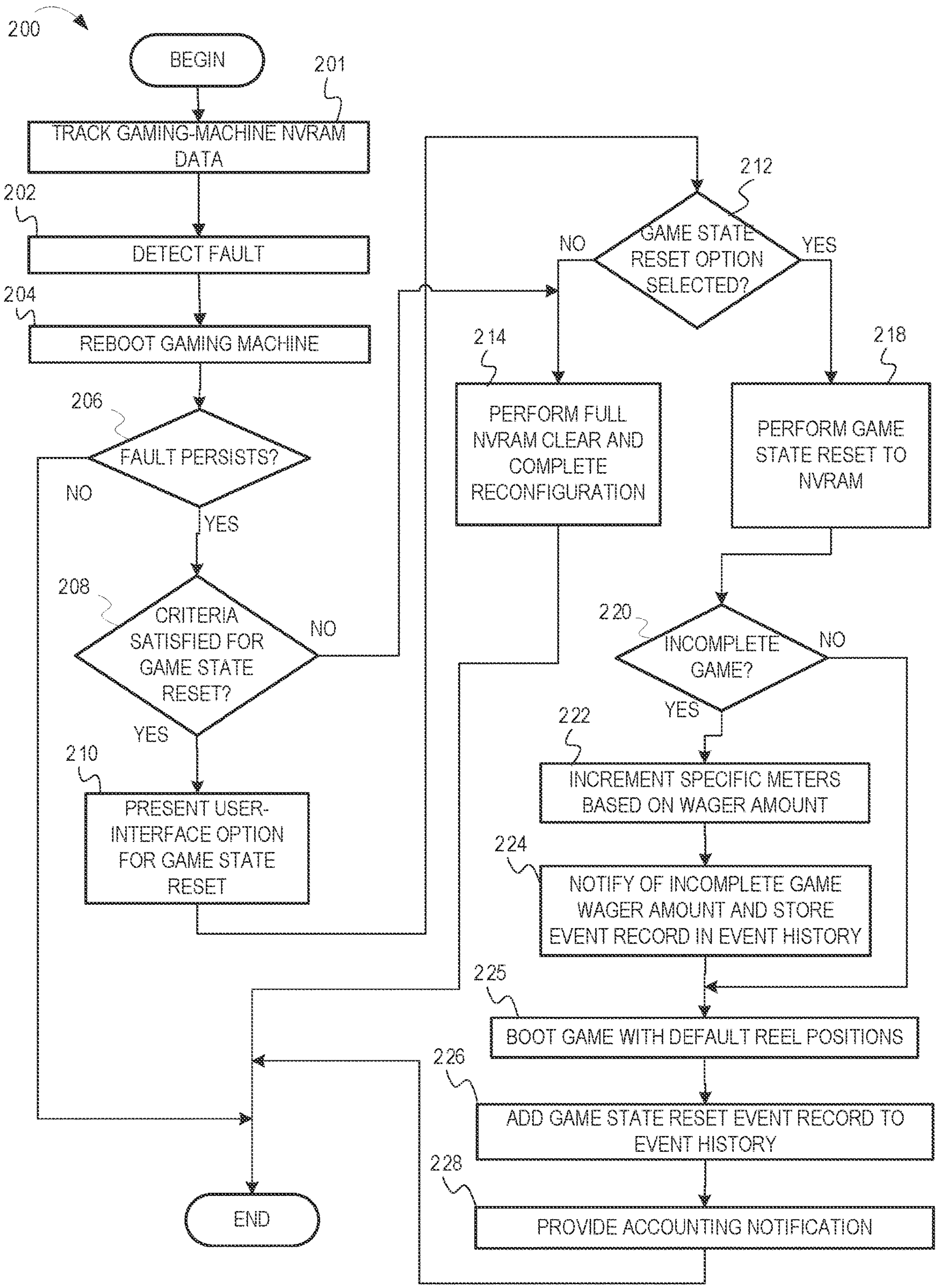
FIG. 2 is a flow diagram that illustrates an example of resetting a gaming machine after a fault according to one or more embodiments of the present disclosure.
Figure 3:
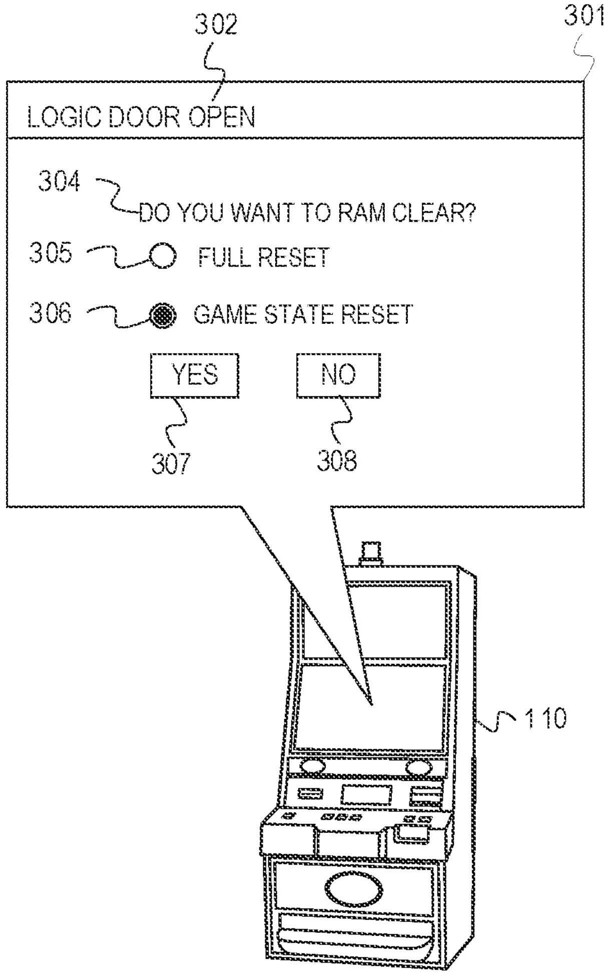
FIG. 3 is an illustration of prompting a game state reset according to one or more embodiments of the present disclosure.
Figure 4:
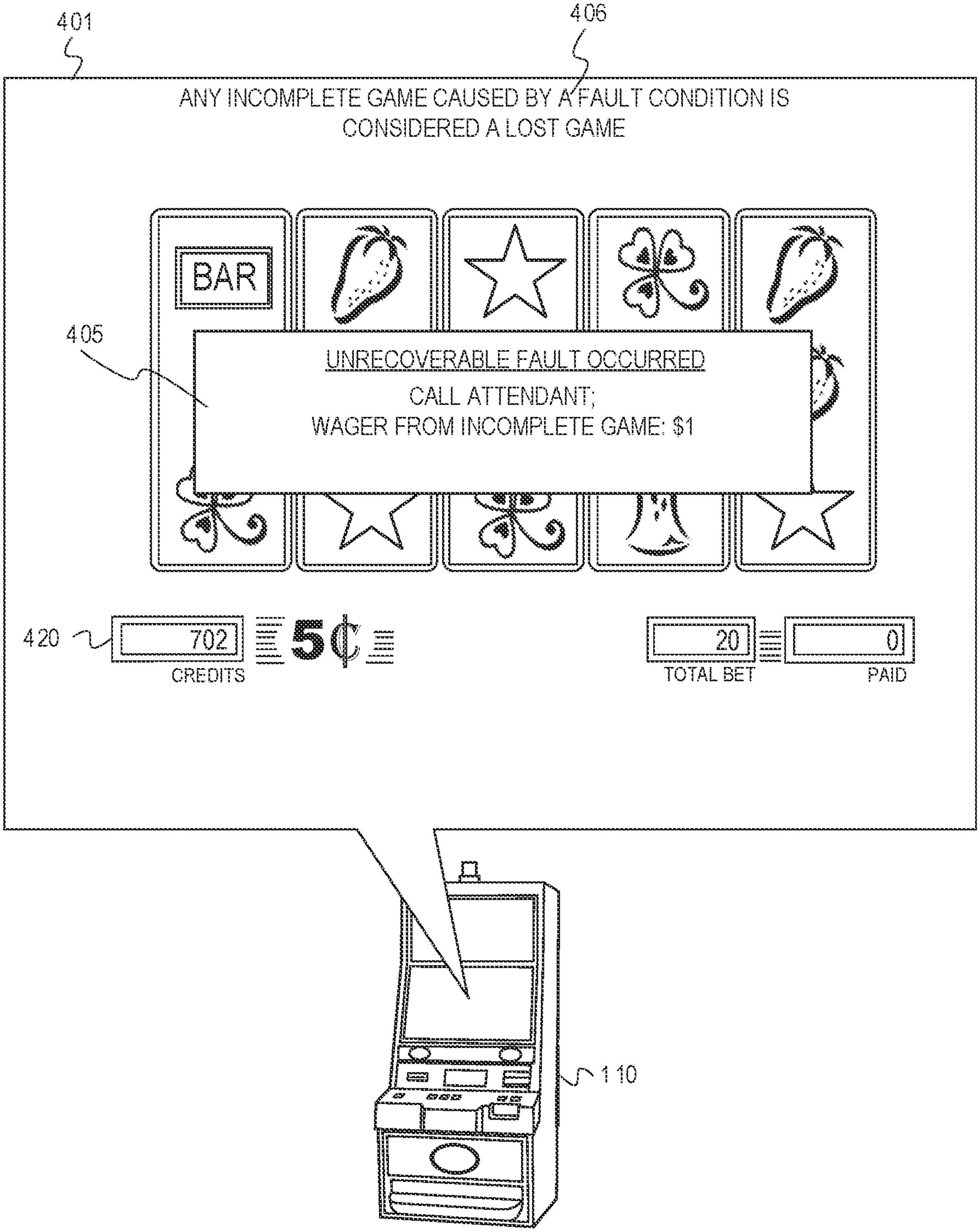
FIG. 4 is an illustration of presenting a notification based on the game state reset according to one or more embodiments of the present disclosure.

FIG. 2 illustrates an example of a method flow ("flow 200") of resetting a gaming machine after a fault according to one or more embodiments of the present disclosure. The description of FIG. 2 refers to a "processor" that performs operations associated with the flow 200. It should be noted that the reference to the processor may refer to the same physical processor or it may be one of a set of a plurality of processors. The set of processors may operate in conjunction with each other and may be distributed across various networked devices (e.g., across the network 100). The types of processors may include a central processing unit, a graphics processing unit, any combination of processors, etc. In one embodiment, the processor may be included in, or refer to, to one or more devices of the network 100, such as any one of the devices connected via the casino network 160 (e.g., gaming machine 110, accounting system 170, etc.). For example, in one embodiment, the processor may be central processing unit (CPU) 842 (see FIG. 8) or a processor in another device mentioned herein, such as a processor (e.g., processor 942) associated with the computer 900, a table controller, a card-handling device, a camera controller, a game controller, server(s), etc. In some embodiments, the processor refers to the fault-recovery controller 111 described in FIG. 1.

Furthermore, FIGS. 1, 3, 4, 5 and 6 will be referenced in the description of FIG. 2.

In FIG. 2, the flow 200 begins at processing block 201, where a processor tracks gaming machine NVRAM data. For example, the processor can store information in categories or types (e.g., into specific folders, with data tags, etc.). In some instances, the first classifications or types of data include data that is necessary for retention to enable the gaming machine to function after resolution of the fault. Further, in some instances, this data includes data authorized by jurisdictional setting (e.g., rule) for possible data retention in response to a fault. In one embodiment, the processor (e.g., the fault recovery controller 111) stores gaming data for potential retention (i.e., the first portion of data 117) into five separate categories (e.g., files, folders, etc.) for (1) game configuration data (e.g., initial game configuration files and/or settings), (2) game play history data (e.g., game play actions, occurrences, etc.), (3) progressive configuration and history data (e.g., configuration and history of progressive games associated with the gaming machine), (4) accounting data (e.g., data related to credit in, credit out, payments, wins, loses, wagers, accounting meters, etc.), and (5) event data (e.g., all events of the gaming machine). Configuration data (e.g., for games and/or progressives) may be stored when the gaming machine is first configured for that game. Game configuration data can include game software and/or other files (e.g., operating system files, platform services files, etc.) necessary for the function of the gaming machine.

Game play history, progressive history, accounting data, and event data are stored over time for game cycles that do not cause the fault. Eventually, a game state occurs for a given game cycle occur which causes the fault. In the case of an unrecoverable fault, the data stored in the NVRAM for the last game cycle (which caused the fault) must be cleared and all other data that is not related to that last game cycle can be retained (e.g., known functional configuration data, history, accounting, and event data for previous game cycles, etc.). Thus, in some embodiments, any data (other than the data of the five categories mentioned) may be considered the current "game state data" (i.e., the second portion of data 118), for deletion during a game state reset process (e.g., see processing block 218). Thus, in some embodiments, some data that is stored on the NVRAM, but which would need to be deleted during a game state reset includes, but is not limited to, the following: game state data for a game cycle that causes the unrecoverable fault, data not categorized for retention, data not authorized for retention by jurisdictional setting(s), etc.

In FIG. 2, the flow 200 continues at processing block 202, where a processor detects an electronic-gaming-machine (EGM) fault. An EGM fault occurs during an unexpected scenario where an EGM (also referred to herein as a "gaming machine") cannot continue its operation. Under this condition, the game play is stopped with a fault message displayed on a screen. Faults may be caused by, but not limited to, one or more of the following: a programming error or bug (e.g., an uninitialized variable in the code which would cause a system error), an overflow error, an unexpected game condition, a temporary or permanent loss of communication with a progressive controller, a power surge that affects the game program, an unhandled exception, etc.

In FIG. 2, the flow 200 continues at processing block 204, where a processor, in response to the fault detection, reboots the gaming machine. In some embodiments, the reboot is in response to user input by a gaming operator staff (e.g., an attendant) that was made aware of the fault. For example, in some embodiments, after the fault is detected, the processor can transmit an electronic message to a device associated with an attendant of the gaming machine. In other embodiments, the rebooting may be done automatically (e.g., in immediate response to detection of the fault). In some situations, the rebooting can cause a correction to the fault, hence the rebooting is included in the flow 200. However, in other embodiments, rebooting can be optional based on user input and/or logic that specifies a particular protocol or reason followed by a particular casino, a particular technical reason, a determination by the attendant, etc.

In FIG. 2, the flow 200 continues at processing block 206, where a processor determines, in response to rebooting the gaming machine, whether the fault continues to exist. If the fault does not continue, then the flow 200 ends. Otherwise, if the fault continues, then the fault is considered to be an unrecoverable fault and the flow 200 proceeds to processing block 208. Unrecoverable faults cannot be recovered by reboot, rather they require clearing some or all of the NVRAM as it has dependency with a game state that caused the unrecoverable fault, and thus the game state data that caused the unrecoverable fault needs to be deleted from the NVRAM.

The flow continues at processing block 208, where the processor determines whether specific criteria is satisfied that permits a game state reset. The criteria can include one or more specific criteria. For example, one criterion can include detecting a trigger signal from a memory protection unit (MPU), such as a signal from a sensor (e.g., of the physical security devices 112) of a logic-box door ("logic door"). The signal is generated, by the sensor, to indicate that the logic door has been securely accessed (e.g., a sensor on the door indicates that the door is in an open state). If the signal indicates that the logic door is securely accessed (i.e., opened), then at least one criterion (of the criteria for processing block 208) is satisfied, and the flow 200 may continue to processing block 210 (given other required criteria is also satisfied). Otherwise, the flow continues at processing block 214.

Another example criterion can include determining whether jurisdictional settings related to the location of the gaming machine (e.g., jurisdictional rules, location settings, etc.), indicate whether a partial deletion (or partial retention) of gaming data from the NVRAM (e.g., as in the game state reset procedure) is authorized or permissible. In some embodiments, the processor can determine whether a jurisdictional setting (e.g., rule) permits the retention of certain kinds of data, such as of certain data types, certain classifications/categories of data, data related to a specific function or purpose, etc. For example, in FIG. 1, the NVRAM includes the first portion of NVRAM data to retain (i.e., the first portion of data 117) and the second portion of NVRAM data to not retain (i.e., the second portion of data 118). The first portion 117 includes the type of data (e.g., game configuration data, game play history data, progressive configuration and history data, accounting data, and event data) authorized by the jurisdictional setting(s) 152. If the jurisdictional setting(s) 152 specify that the partial deletion/retention of gaming data (e.g., via the game state reset) is permissible, then at least one criterion (of the criteria for processing block 208) is satisfied, and the flow 200 may continue to processing block 210 (given any other required criteria is also satisfied). Otherwise, the flow continues at processing block 214.

Another example criterion includes determining whether accounting meters of the gaming machine are balanced. Accounting meters are used for tracking the credit flow in the gaming system. In one embodiment, the accounting meters include meters for credits in, credits out, wins, wagered amounts and a current balance. During a balanced state of the meters, the total credits in plus a total amount won, should be equal to sum of total credits out, total wager and current balance (i.e., Total credits in+Total wins=Total credits out+Total wager+Current balance). The "Total credits in+Total wins" may be referred to herein as a first meter-subtotal value. The "Total credits out+Total wager+Current balance" may be referred to herein as a second meter-subtotal value. To verify the balanced state of meters, the processor (e.g., fault recover controller 111) performs a self-audit check to determine whether the first meter-subtotal value equates to the second meter-subtotal value. If the gaming machine power is interrupted while the meters are being updated (e.g., if the unrecoverable fault occurs during an intermediate state of a game), the set of meters could have been interrupted in a partially updated state, thus causing the unbalanced state. If a game state reset is performed at this stage, the meters update cannot be continued from where it was left before power interruption and the meters will remain in an unbalanced state. Consequently, if the accounting meters are balanced, then at least one criterion (of the criteria for processing block 208) is satisfied, and the flow 200 may continue to processing block 210 (given any other required criteria is also satisfied). Otherwise, if the accounting meters are not balanced, then the flow continues at processing block 214.

In FIG. 2, the flow 200 continues at processing block 210, where a processor, in response to determining that the criteria is satisfied for a game state reset, presents a user-interface option for a game state reset. For example, in FIG. 3, the gaming machine 110 presents, via a display, a user interface 301 to present a RAM clear menu. The user interface 301 presents an indication 302 that the logic door is opened. Further, the user interface 301 includes a prompt 304 which indicates a choice to select from two options. The first option is for a full NVRAM clear and reset, and is related with a first user-input control (e.g., radio button 305). The second option is for a partial NVRAM clear (e.g., a game state reset), and is related with a second user-input control (e.g., radio button 306). Buttons 307 and 308 can be used to select (or not select) a given option. However, if the criteria is not satisfied for a game state reset option (e.g., at processing block 208), then the user interface 301 may only specify an option for a full reset (i.e., for a full NVRAM clear and complete reconfiguration). In yet other embodiments, the processor can, in some instances, present only an option for a game state reset, or even run the game state reset automatically, based on a specific set of conditions (e.g., physical, logical, etc.). Thus, referring momentarily to FIG. 2, in some embodiments, the processing blocks 210 and 212 may be optional or modified such that the game state reset is presented as an only option for selection or that the game state reset is automatically performed. For example, in one embodiment, the processor may provide an option to present an option for either a full NVRAM reset or a game state reset in response to detection of signals from sensors associated with physical security devices (e.g., the physical security devices 112). For instance, the processor may present only an option for a game state reset if a specific combination of physical security measures are met, for example, if an attendant reboots the gaming machine when the logic door open and when a key for a side lock of the gaming machine cabinet is turned in a specific direction. In another example, an alternate embodiment of the flow 200 can assess, at processing block 208, whether conditions are met to automatically flow from processing block 208 directly to processing block 218.

Figure 5:
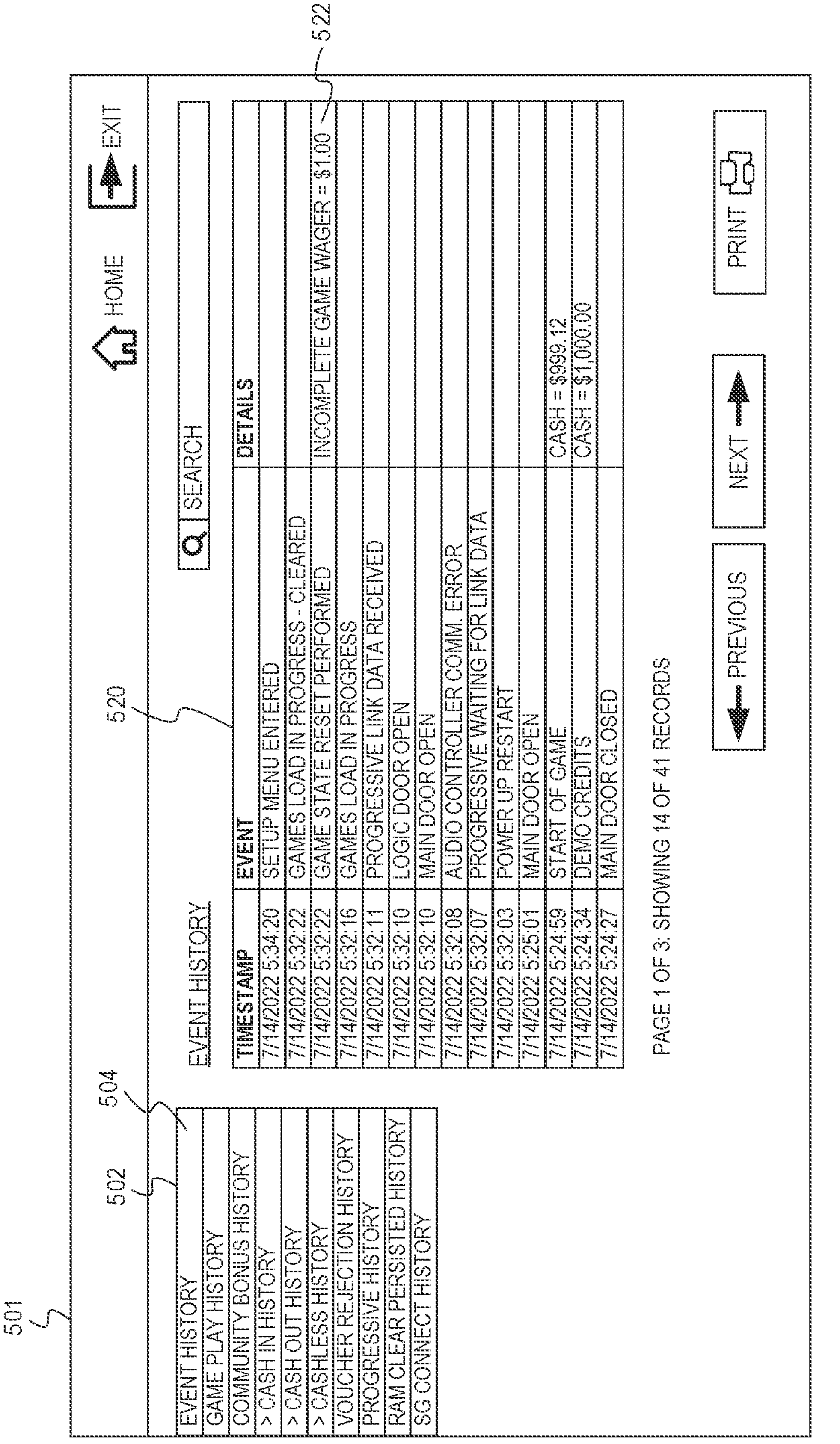
FIG. 5 is an illustration of a gaming machine fault-recovery tool according to one or more embodiments of the present disclosure.
Figure 6:
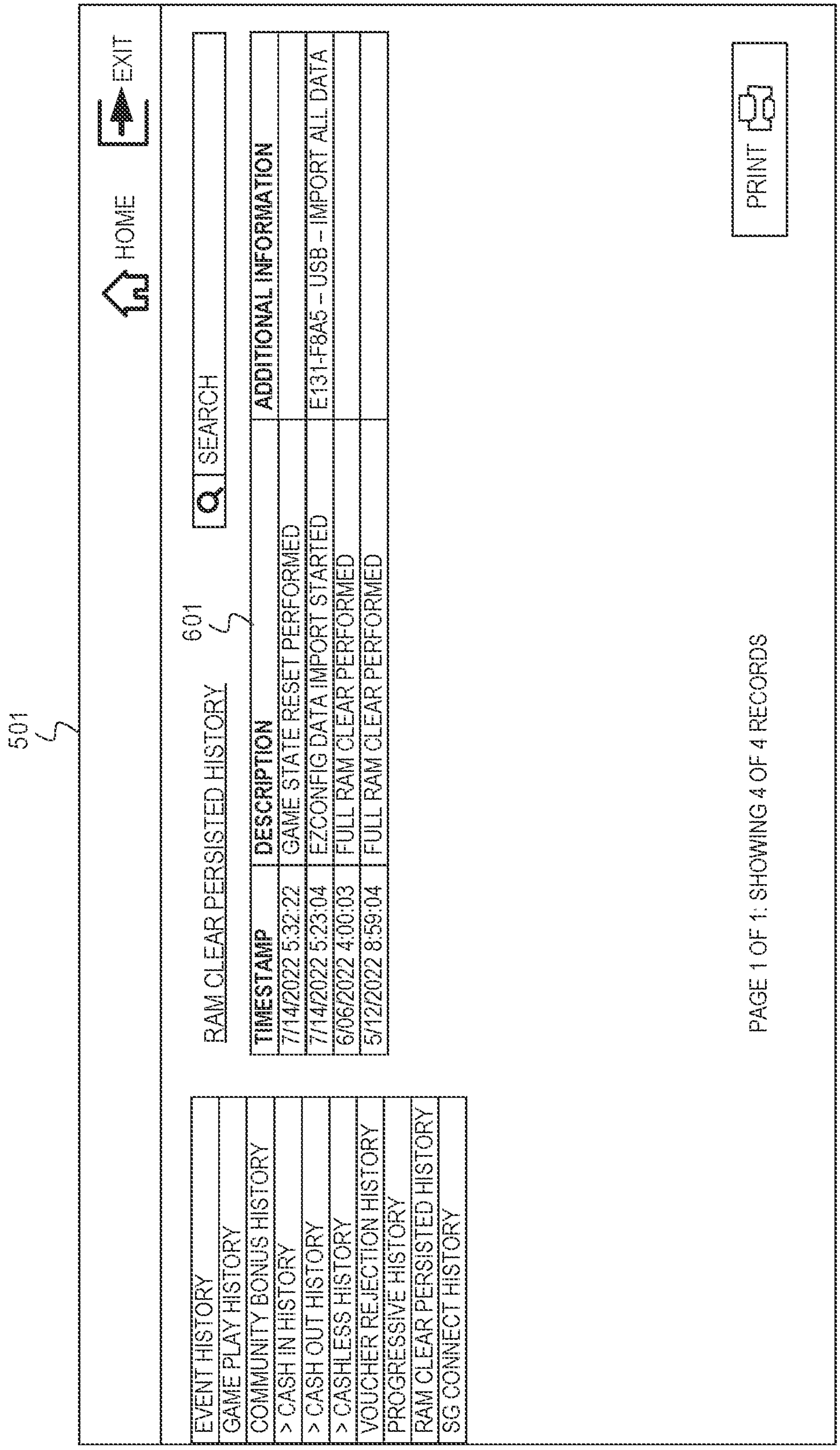
FIG. 6 is an illustration of a gaming machine fault-recovery tool according to one or more embodiments of the present disclosure.

Referring again to FIG. 2, the flow 200 continues at processing block 212, where a processor determines whether the game state reset option is selected. The game state reset is not required to be performed in every instance, even in situations where the game state reset is permissible. An operator may decide to allow the processor to perform a full NVRAM clear and reconfiguration (e.g., at processing block 214) instead of choosing the game state reset option. In some embodiments, there may be two different types or locations of NVRAM: (1) a battery backed NVRAM and (2) a solid-state drive (SSD) where all game images, platform services images, operating system images, jurisdictional images, etc. resides. In one embodiment, the SSD is logically partitioned, with at least one partition storing RAM clear persisted data, such as log files that are generated in response to, and store information about, the specific conditions that occurred to cause the fault. In one embodiment, as shown in FIG. 6, a history 601 of RAM clear persisted data is stored via a menu 501 of a fault-recovery tool (e.g., see FIG. 5). The persisted data includes log data that a manufacturer of the gaming machine can use to determine the cause of the fault, thus it can be advantageous to retain the logs and not delete them from the gaming machine memory. In one embodiment, the processor can provide an option for the RAM clear persisted data to be retained (i.e., not erased) in the case of a full NVRAM clear procedure. In one embodiment, for progressive game data, as the progressive values increase (for the gaming machine(s) that contribute to the progressive pool), encrypted progressive values can be stored in the RAM clear persisted data. In some embodiments, telemetry data is stored in the RAM clear persisted data (e.g., a granular level of data on game-play behavior and different states of gaming machines). In some embodiments, the telemetry data is further transmitted periodically to an external data storage system using an external cellular device (e.g., transmitted to a cloud storage service, such as the Amazon Web Services® service provided by Amazon.com).

In FIG. 2, the flow 200 continues at processing block 218, where, if the game state reset option is selected, a processor performs the game state reset to the NVRAM. More specifically, referring momentarily to FIG. 1, the processor retains the first portion of data 117 and erases the second portion of data 118. In one embodiment, all NVRAM files are deleted which caused the fault. In other words, the processor erases the game state data (for the most recent or "current" game) that caused the inconsistency which resulted in the fault. In addition, data is retained on the NVRAM which allows for complete function of the gaming machine, such as the initial configuration of the gaming machine (e.g., initial software data, game assets, operating system files, platform services files, etc.). Additional retained data includes data that may need inspection or that would need to be referenced by jurisdictional regulators, auditors, etc., such as game history data, events and history, accounting information, etc. In some embodiments, the processor retains the data categorized into the files, folders, etc. related to the categories mentioned at processing block 201, such as the files or folders related to the game configuration data, game play history data, progressive configuration and history data, accounting data (e.g., accounting meters), and event data. Thus, in one embodiment, all NVRAM files are deleted except those that store configuration information, game play information for game cycles prior to the current game cycle, accounting information about past play, events and history related information. In some embodiments, the processor (e.g., the fault recovery controller 111), reads an exclusion list that specifies certain identifiers (e.g., names, types, tags, etc., for files, folders, etc.) that should be retained (i.e., that should be excluded from being deleted). In other embodiments, the processor searches for specific files, folders, etc. to retain and/or delete based on certain identifiers (e.g., file name, category, tags, etc.).

In FIG. 2, the flow 200 continues at processing block 220, where a processor determines whether there was an incomplete game in progress that was interrupted by the fault. An incomplete game occurs when a game cycle begins (e.g., after a wager is committed), but the fault occurs before the game is resolved (e.g., before the game cycle can present a game outcome and/or before the game can resolve any required response to a game outcome). In one embodiment, the processor determines whether there was an incomplete game at processing block 208 as part of determining whether specific criteria is met. For example, if an incomplete game is detected, and the accounting meters are unbalanced, then the flow 200 would have instead diverted to processing block 214. On the other hand, if an incomplete game occurs, and the accounting meters are balanced, then the flow 200 continues (from processing block 220) to processing block 222, where a processor increments certain game meters based on the wager amount. For example, any incomplete game is considered as lost game for the patron (e.g., as specified by disclaimer 406 presented via the display 401). Thus, in the case of an unfinished game, the processor increments (by one each) a games played meter (to reflect the initiation of the gaming cycle for the unfinished game) and a games lost meter (to reflect the loss of the incomplete game). Furthermore, the wager amount from the incomplete game will be reflected in the meter associated with total bets made (i.e., the coin-in meter). For example, the wager was made and deducted from the credit meter before the fault. Gaming regulatory requirements restrict incrementing of the credit meter (e.g., for purposes of a refund) unless actual funds are inserted/transferred to the game or unless a game is won. Hence, the credit meter cannot merely be rolled back (i.e., incremented) to refund the wager. Rather, the wager appears in the coin-in meter. Further, although any incomplete game will be considered as lost game for the patron, the operator may still physically refund the patron the wager amount for the incomplete game (e.g., based on notification of the lost wager amount at processing block 224, as specified in message 405).

Referring again to FIG. 2, the flow 200 continues at processing block 224, where a processor notifies of the incomplete game and stores an event record of the incomplete wager amount in an event history. For example, in FIG. 4, the processor presents, via display 401 of the gaming machine 110, message 405 (e.g., in a displayed attendant banner) that indicates that the fault occurred, and also indicates the wager amount that was from the incomplete game. Based on the displayed lost wager amount, the attendant (or other casino staff) can refund the patron the lost amount. In some embodiments, a security display in a game screen can further display a message that the portion of the NVRAM was cleared (e.g., a message that states “RAM Cleared and Restart”). A similar message can be provided for a full NVRAM clear operation (at processing block 214). In one embodiment, the message 405 (or other messages related to deletion of retention of gaming data) can be cleared by turning a physical key at the gaming machine, or by some other attendant action or user input. Furthermore, in some embodiments, the processor can automate a payback of a lost wager such as by causing a ticket printer to automatically print out a ticket in the amount of the lost wager (for the player to redeem), automatically adding the amount of the lost wager to a player account, profile, electronic wallet, etc., and so forth.

Referring again to FIG. 2, the flow 200 continues at processing block 225, where a processor boots the game to a default operational state using at least a portion of the retained data. For example, the game is restored to default reel positions as specified in the retained configuration data for an initial configuration of the gaming machine (as stored in the first portion of data 117, which was retained at processing block 218).

Still referring to FIG. 2, the flow 200 continues at processing block 226, where a processor adds an event record of the game state reset to an event history. For example, as shown in FIG. 5, the menu 501 specifies an event history log 520 (selectable, by user interface control 504 (e.g., a link) specified in navigation table 502). The event history log 520 specifies various timestamped event records. One of the event records includes event record 522, which specifies (in the “Details” section), the wager amount (e.g., the $1 wager) from the unfinished game. In one embodiment, the event history is stored in the first portion of data 117, hence the event records are added to the first portion of data 117.

In FIG. 2, the flow 200 continues at processing block 228, where a processor provides accounting notification. For example, the processor notifies a networked accounting host system with an appropriate event. For example, as shown in FIG. 1, the fault recovery controller 111 notifies the accounting system 170, such as by submitting an exception event to the online system for notification of the game state reset and/or notification that configuration options have changed. The notification can be specific to the type of accounting protocol used. For example, in the case of Slot Accounting System (SAS) protocol, the processor can issue a SAS exception $3C event to the host system.

Figure 7:
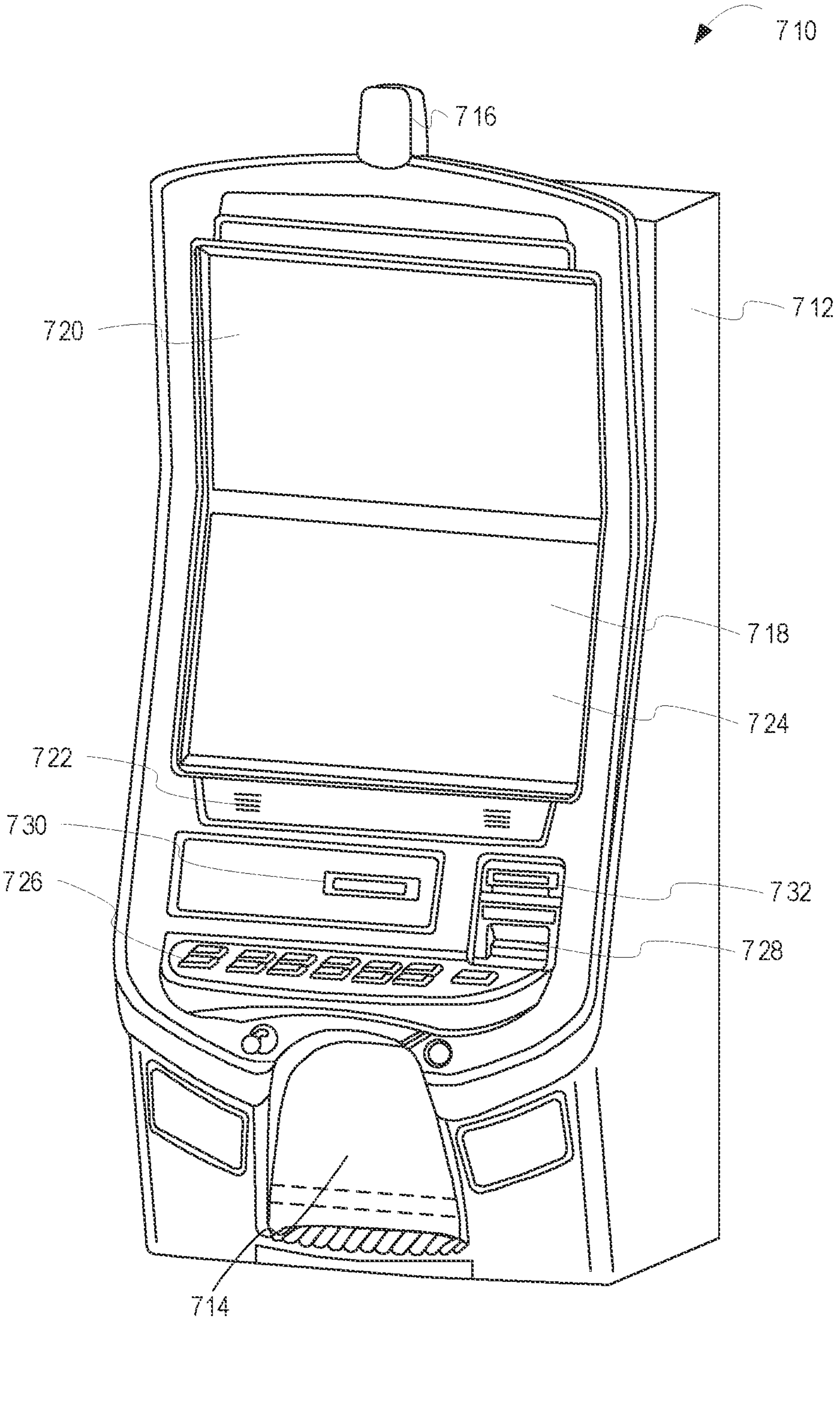
FIG. 7 is a perspective view of a free-standing gaming machine according to one or more embodiments of the present disclosure.

Referring to FIG. 7, there is shown a gaming machine 710 similar to those operated in gaming establishments, such as casinos. With regard to the present invention, the gaming machine 710 may be any type of gaming terminal or machine and may have varying structures and methods of operation. For example, in some aspects, the gaming machine 710 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 710 may take any suitable form, such as floor-standing models as shown, handheld mobile units, bartop models, workstation-type console models, etc. Further, the gaming machine 710 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 710 illustrated in FIG. 7 comprises a gaming cabinet 712 that securely houses various input devices, output devices, input/output devices, internal electronic/electromechanical components, and wiring. The cabinet 712 includes exterior walls, interior walls and shelves for mounting the internal components and managing the wiring, and one or more front doors that are locked and require a physical or electronic key to gain access to the interior compartment of the cabinet 712 behind the locked door. The cabinet 712 forms an alcove 714 configured to store one or more beverages or personal items of a player. A notification mechanism 716, such as a candle or tower light, is mounted to the top of the cabinet 712. It flashes to alert an attendant that change is needed, a hand pay is requested, or there is a potential problem with the gaming machine 710.

The input devices, output devices, and input/output devices are disposed on, and securely coupled to, the cabinet 712. By way of example, the output devices include a primary presentation device 718, a secondary presentation device 720, and one or more audio speakers 722. The primary presentation device 718 or the secondary presentation device 720 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 718, 720, the audio speakers 722, lighting assemblies, and/or other devices associated with presentation are collectively referred to as a "presentation assembly" of the gaming machine 710. The presentation assembly may include one presentation device (e.g., the primary presentation device 718), some of the presentation devices of the gaming machine 710, or all of the presentation devices of the gaming machine 710. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 718 and/or the secondary presentation device 720, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 710. The gaming machine 710 may include a touch screen(s) 724 mounted over the primary or secondary presentation devices, buttons 726 on a button panel, a bill/ticket acceptor 728, a card reader/writer 730, a ticket dispenser 732, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen(s) 724, buttons 726, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 710 includes one or more value input/payment devices and value output/payout devices. In order to deposit cash or credits onto the gaming machine 710, the value input devices are configured to detect a physical item associated with a monetary value that establishes a credit balance on a credit meter such as a "credits" meter (e.g., see credit meter 420 in FIG. 4). The physical item may, for example, be currency bills, coins, tickets, vouchers, coupons, cards, and/or computer-readable storage mediums. The deposited cash or credits are used to fund wagers placed on the wagering game played via the gaming machine 710. Examples of value input devices include, but are not limited to, a coin acceptor, the bill/ticket acceptor 728, the card reader/writer 730, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 420, the value output devices are used to dispense cash or credits from the gaming machine 710. The credits may be exchanged for cash at, for example, a cashier or redemption station. Examples of value output devices include, but are not limited to, a coin hopper for dispensing coins or tokens, a bill dispenser, the card reader/writer 730, the ticket dispenser 732 for printing tickets redeemable for cash or credits, a wireless communication interface for transmitting cash or credit data to a nearby mobile device, and a network interface for depositing cash or credits to a remote account via an electronic funds transfer.

Figure 8:
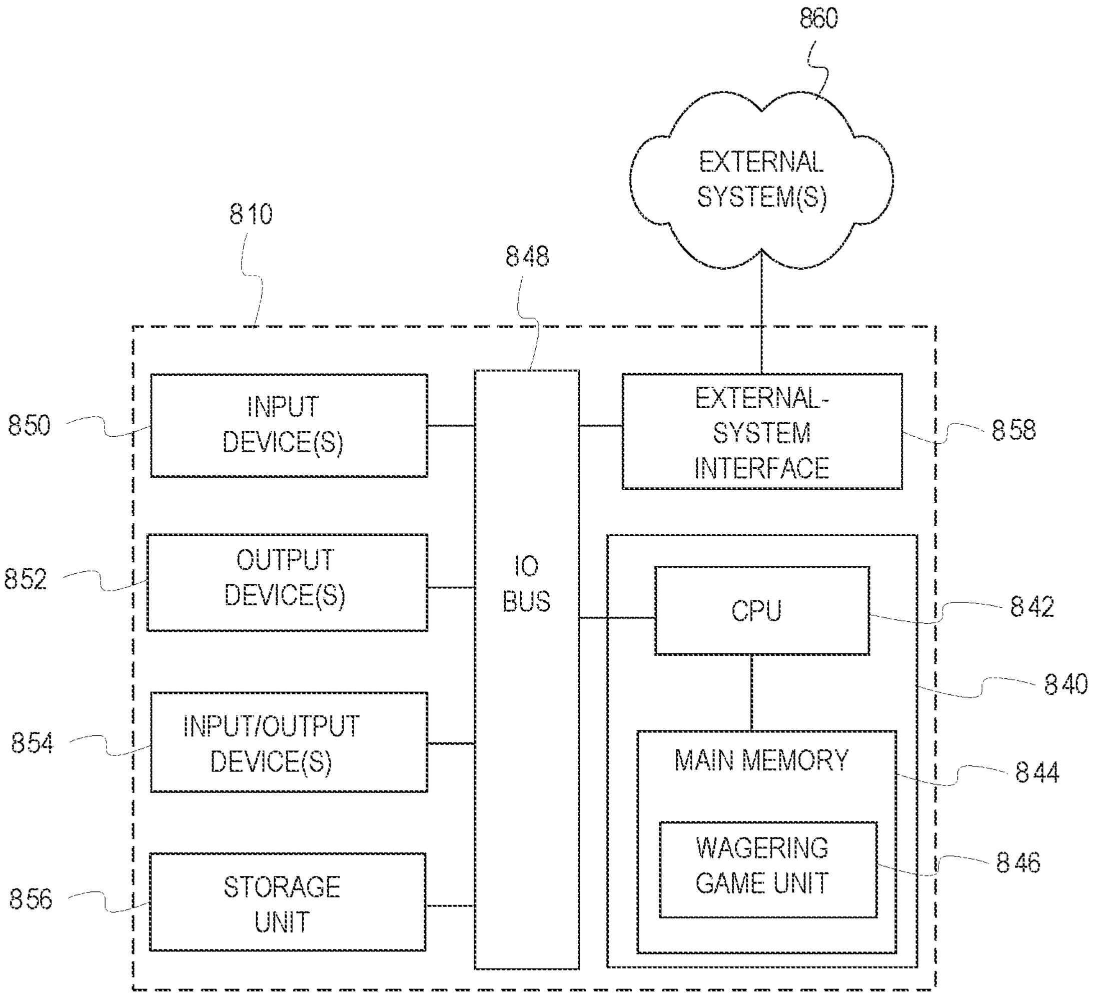
FIG. 8 is a block diagram of a gaming system according to one or more embodiments of the present disclosure.

Turning now to FIG. 8, there is shown a block diagram of the gaming-machine architecture. The gaming machine 810 includes game-logic circuitry 840 (e.g., securely housed within a locked box inside gaming cabinet 712 in FIG. 7). The game-logic circuitry 840 includes a central processing unit (CPU) 842 connected to a main memory 844 that comprises one or more memory devices. The CPU 842 includes any suitable processor(s), such as those made by Intel and AMD. By way of example, the CPU 842 includes a plurality of microprocessors including a master processor, a slave processor, and a secondary or parallel processor. Game-logic circuitry 840, as used herein, comprises any combination of hardware, software, or firmware disposed in or outside of the gaming machine 810 that is configured to communicate with or control the transfer of data between the gaming machine 810 and a bus, another computer, processor, device, service, or network. The game-logic circuitry 840, and more specifically the CPU 842, comprises one or more controllers or processors and such one or more controllers or processors need not be disposed proximal to one another and may be located in different devices or in different locations. The game-logic circuitry 840, and more specifically a main memory 844, comprises one or more memory devices which need not be disposed proximal to one another and may be located in different devices or in different locations. The game-logic circuitry 840 is operable to execute all of the various gaming methods and other processes disclosed herein. The main memory 844 includes a wagering game unit 846. In one embodiment, the wagering game unit 846 causes wagering games to be presented, such as video poker, video blackjack, video slots, video lottery, etc., in whole or part.

The game-logic circuitry 840 is also connected to an input/output (I/O) bus 848, which can include any suitable bus technologies, such as an AGTL+ frontside bus and a PCI backside bus. The I/O bus 848 is connected to various input devices 850, output devices 852, and input/output devices 854, such as those discussed above in connection with FIG. 7. The I/O bus 848 is also connected to a storage unit 856 and external-system interface 858, which is connected to external system(s) 860 (e.g., wagering game networks, casino network 160, etc.).

The external system(s) 860 includes, in various aspects, a gaming network (e.g., casino network 160), other gaming machines or terminals, a gaming server, a remote controller, communications hardware, or a variety of other interfaced systems or components, in any combination. In yet other aspects, the external system(s) 860 comprises a player's portable electronic device (e.g., cellular phone, electronic wallet, etc.) and the external-system interface 858 is configured to facilitate wireless communication and data transfer between the portable electronic device and the gaming machine 810, such as by a near-field communication path operating via magnetic-field induction or a frequency-hopping spread spectrum RF signals (e.g., Bluetooth, etc.).

The gaming machine 810 optionally communicates with the external system(s) 860 such that the gaming machine 810 operates as a thin, thick, or intermediate client. The game-logic circuitry 840—whether located within ("thick client"), external to ("thin client"), or distributed both within and external to ("intermediate client") the gaming machine 810-is utilized to provide a wagering game on the gaming machine 810. In general, the main memory 844 stores programming for a random number generator (RNG), game-outcome logic, and game assets (e.g., art, sound, etc.)-all of which obtained regulatory approval from a gaming control board or commission and are verified by a trusted authentication program in the main memory 844 prior to game execution. The authentication program generates a live authentication code (e.g., digital signature or hash) from the memory contents and compares it to a trusted code stored in the main memory 844. If the codes match, authentication is deemed a success and the game is permitted to execute. If, however, the codes do not match, authentication is deemed a failure that must be corrected prior to game execution. Without this predictable and repeatable authentication, the gaming machine 810, external system(s) 860, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 842 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 842 when executing the game-outcome logic to determine a resultant outcome for that instance of the wagering game. The resultant outcome is then presented to a player of the gaming machine 810 by accessing the associated game assets, required for the resultant outcome, from the main memory 844. The CPU 842 causes the game assets to be presented to the player as outputs from the gaming machine 810 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 810 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 810 may include additional peripheral devices or more than one of each component shown in FIG. 8. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random-access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering game outcome, for that particular wagering game instance, is then revealed to the player in due course following initiation of the wagering game. The method comprises the acts of conducting the wagering game using a gaming apparatus, such as the gaming machine 710 depicted in FIG. 7, following receipt of an input from the player to initiate a wagering game instance. The gaming machine 810 then communicates the wagering game outcome to the player via one or more output devices (e.g., primary presentation device 718 or secondary presentation device 720) through the presentation of information such as, but not limited to, text, graphics, static images, moving images, etc., or any combination thereof. In accord with the method of conducting the wagering game, the game-logic circuitry 840 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 840 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 842 causes the recording of a digital representation of the wager in one or more storage media (e.g., storage unit 856), the CPU 842, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 842 (e.g., the wager in the present example). As another example, the CPU 842 further, in accord with the execution of the stored instructions relating to the wagering game, causes the primary presentation device 718, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 840 to determine the outcome of the wagering-game instance. In at least some aspects, the game-logic circuitry 840 is configured to determine an outcome of the wagering-game instance at least partially in response to the random parameter.

In one embodiment, the gaming machine 810 and, additionally or alternatively, the external system(s) 860 (e.g., a gaming server), means gaming equipment that meets the hardware and software requirements for fairness, security, and predictability as established by at least one state's gaming control board or commission. Prior to commercial deployment, the gaming machine 810, the external system(s) 860, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 710 may be implemented with hardware and software architectures, circuitry, and other special features that differentiate it from general-purpose computers (e.g., desktop PCs, laptops, and tablets).

Figure 9:
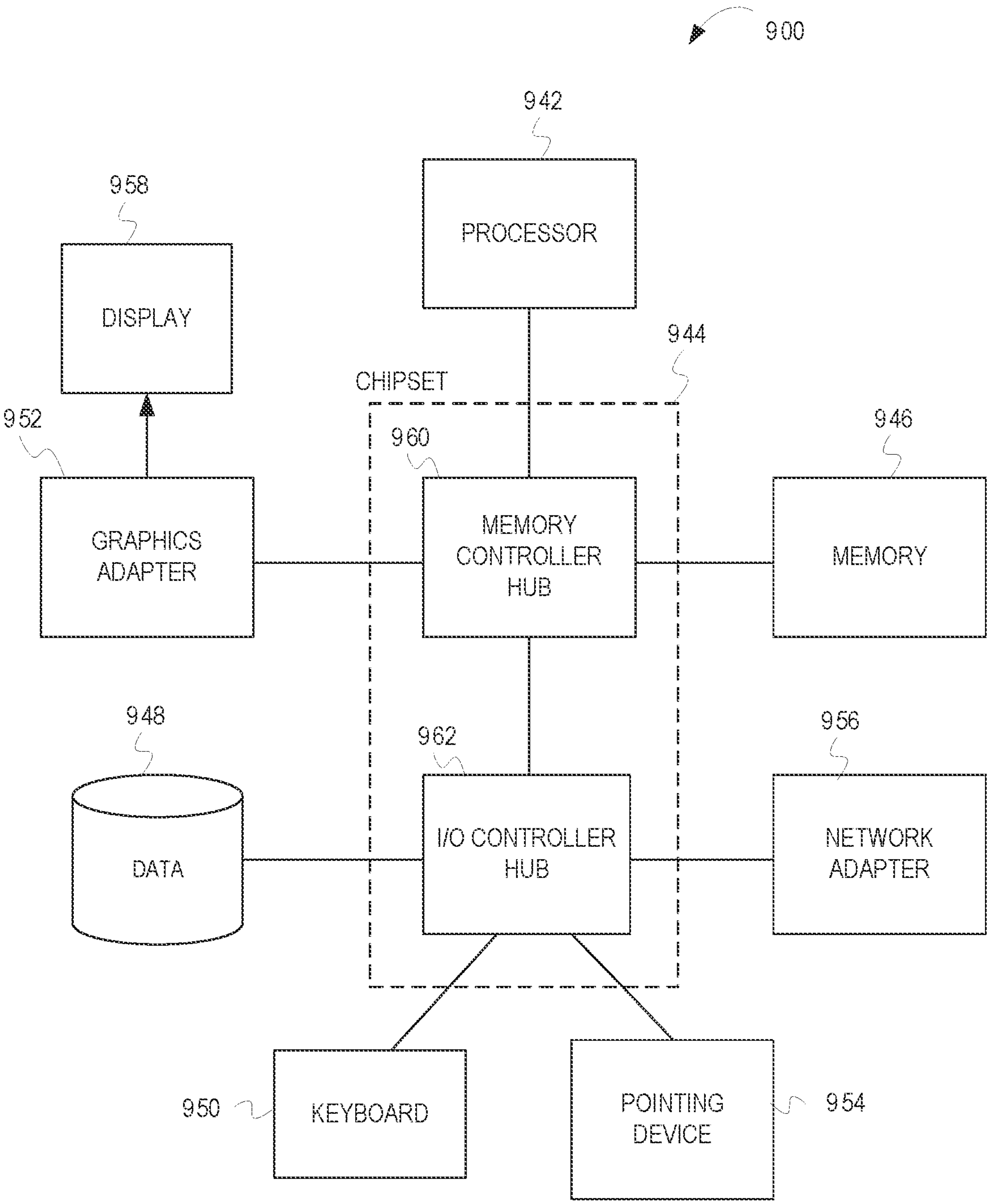
FIG. 9 is a block diagram of a computer system according to one or more embodiments of the present disclosure.

FIG. 9 is shown a block diagram of a computer system 900 according to one or more embodiments. The computer system 900 includes at least one processor 942 coupled to a chipset 944, as indicated in dashed lines. Also coupled to the chipset 944 are memory 946, a storage device 948, a keyboard 950, a graphics adapter 952, a pointing device 954, and a network adapter 956. A display 958 is coupled to the graphics adapter 952. In one embodiment, the functionality of the chipset 944 is provided by a memory controller hub 960 and an I/O controller hub 962. In another embodiment, the memory 946 is coupled directly to the processor 942 instead of to the chipset 944.

The storage device 948 is any non-transitory computer-readable storage medium, such as a hard drive, a compact disc read-only memory (CD-ROM), a DVD, or a solid-state memory device (e.g., a flash drive). The memory 946 holds instructions and data used by the processor 942. The pointing device 954 may be a mouse, a track pad, a track ball, or another type of pointing device, and it is used in combination with the keyboard 950 to input data into the computer system 900. The graphics adapter 952 displays images and other information on the display 958. The network adapter 956 couples the computer system 900 to a local or wide area network.

As is known in the art, the computer system 900 can have different and/or other components than those shown in FIG. 9. In addition, the computer system 900 can lack certain illustrated components. In one embodiment, the computer system 900 acting as a server may lack the keyboard 950, pointing device 954, graphics adapter 952, and/or display 958. Moreover, the storage device 948 can be local and/or remote from the computer system 900 (such as embodied within a storage area network (SAN)). Moreover, other input devices, such as, for example, touch screens may be included.

The network adapter 956 (may also be referred to herein as a communication device) may include one or more devices for communicating using one or more of the communication media and protocols discussed above with respect to FIG. 1, FIG. 2, FIG. 3, FIG. 4, FIG. 5, FIG. 6., FIG. 7, or FIG. 8.

In addition, some or all of the components of this general computer system 900 of FIG. 9 may be used as part of the processor and memory discussed above with respect to the systems or devices described for FIG. 1, FIG. 2, FIG. 3, FIG. 4, FIG. 5, FIG. 6, FIG. 7 or FIG. 8.

In some embodiments, a gaming system may comprise several such computer systems 900. The gaming system may include load balancers, firewalls, and various other components for assisting the gaming system to provide services to a variety of user devices.

The computer system 900 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 948, loaded into the memory 946, and executed by the processor 942.

FIG. 2 described by way of example above, represents a data processing method (e.g., algorithm) that corresponds to at least some instructions stored and executed by a processor and/or logic circuitry associated with the gaming machine 110, the accounting system 170, etc. However other embodiments can utilize processors and/or logic circuitry of any of the devices described for FIG. 1, FIG. 2, FIG. 3, FIG. 4, FIG. 5, FIG. 6, FIG. 7, FIG. 8, or FIG. 9 to perform the above described functions associated with the disclosed concepts.

Any component of any embodiment described herein may include hardware, software, or any combination thereof.

Further, the operations described herein can be performed in any sensible order. Any operations not required for proper operation can be optional. Further, all methods described herein can also be stored as instructions on a computer readable storage medium, which instructions are operable by a computer processor. All variations and features described herein can be combined with any other features described herein without limitation. All features in all documents incorporated by reference herein can be combined with any feature(s) described herein, and also with all other features in all other documents incorporated by reference, without limitation.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

What is claimed is:

1. A method comprising:
storing, by an electronic processor, gaming data in a non-volatile random-access memory (NVRAM) of a gaming machine;
detecting, by the electronic processor after the storing, an unrecoverable fault of the gaming machine;
determining, by the electronic processor in response to detecting the unrecoverable fault, that criteria is satisfied for authorization of a partial deletion of the gaming data from the NVRAM;
determining, by the electronic processor in response to determining that the criteria is satisfied, a first portion of the gaming data to retain on the NVRAM;
deleting, by the electronic processor after determining the first portion of the gaming data to retain, a second portion of the gaming data without deleting the first portion of the gaming data; and
booting, by the electronic processor, a game of the gaming machine to a default operational state using at least some of the first portion of the gaming data.

2. The method of claim 1, wherein the first portion of the gaming data comprises game configuration data, accounting data, progressive game configuration data, progressive game history data, game play history data, and event data stored in the NVRAM prior to occurrence of the unrecoverable fault.

3. The method of claim 1, wherein the storing of the gaming data comprises storing, by the electronic processor, portions of the gaming data for each of a plurality of game cycles that occur for the gaming machine, and wherein the unrecoverable fault occurs as a result of a game state for a last of the plurality of game cycles that occurs immediately prior to the unrecoverable fault.

4. The method of claim 3, wherein the second portion of the gaming data is associated with the last of the plurality of game cycles; and wherein the first portion of the gaming data is associated with others of the plurality of game cycles that occur prior to the last of the plurality of game cycles.

5. The method of claim 1, wherein the determining that the criteria is satisfied comprises determining, by the electronic processor, that the first portion of the gaming data is authorized by a jurisdictional setting associated with the gaming machine.

6. The method of claim 1, wherein the determining that the criteria is satisfied comprises determining, by the electronic processor, that accounting meters for the gaming machine are in a balanced state.

7. The method of claim 6, wherein the determining that the account meters are in the balanced state comprises determining, by the electronic processor, that a first meter-subtotal value equates to a second meter-subtotal value, wherein the first meter-subtotal value consists of a total amount of credits in plus a total amount of credits won, and wherein the second meter-subtotal value consists of a total amount of credits out, plus a total amount of credits wagered, plus a current credit balance of the gaming machine.

8. The method of claim 1, wherein the determining that the criteria is satisfied comprises determining, by the electronic processor via a sensor of a logic box of the gaming machine, that a door to the logic box is in an open state.

9. The method of claim 1, wherein the determining the first portion of the gaming data comprises determining, by the electronic processor, that the first portion of the gaming data is one or more categories of data, wherein the second portion of the gaming data is not the one or more categories of data.

10. The method of claim 9, wherein the one or more categories of data are authorized for retention on the NVRAM based on a jurisdictional rule associated with a location of the gaming machine.

11. The method of claim 1, wherein the determining the first portion of the gaming data comprises reading, by the electronic processor, identifiers specified on an exclusion list, and wherein the deleting the second portion of the gaming data comprises deleting all files on the NVRAM that do not include the identifiers specified on the exclusion list.

12. The method of claim 1 further comprising:
in response to determining that the criteria is satisfied, presenting, by the electronic processor via a user interface of the gaming machine, a user-interface control that specifies an option to retain the first portion of the gaming data, and
wherein the determining the first portion of the gaming data to retain is in response to detecting a user input that selects the option.

13. The method of claim 1 further comprising rebooting, by the electronic processor, the gaming machine prior to detecting the unrecoverable fault.

14. The method of claim 1 further comprising: in response to deleting the second portion of the gaming data, adding, by the electronic processor, an event record to the first portion of the gaming data, wherein the event record indicates information about one or more of the unrecoverable fault, the first portion of the gaming data that was retained, or the second portion of the gaming data that was erased.

15. The method of claim 1 further comprising:
determining, by the electronic processor, that the unrecoverable fault caused an unfinished game;
incrementing, by the electronic processor, a games played meter and a games lost meter of the gaming machine; and
presenting, by the electronic processor via a display of the gaming machine, a notification of a wager amount for the unfinished game.

16. The method of claim 1 further comprising issuing, by the electronic processor in response to deleting the second portion of the gaming data, an exception event to an accounting host system communicatively coupled to the gaming machine.

17. The method of claim 1, wherein the at least some of the first portion of the gaming data comprises configuration data stored, by the electronic processor, in the NVRAM prior to detecting the unrecoverable fault.

18. A system comprising:
a non-volatile random-access memory (NVRAM) of a gaming machine;
an electronic processor configured to execute instructions, which when executed cause the system to perform operations to:
store gaming data in the NVRAM;
detect, after the gaming data is stored, an unrecoverable fault of the gaming machine;
determine, in response to detection of the unrecoverable fault, that one or more criteria are satisfied for authorization of a partial deletion of the gaming data from the NVRAM;
determine, in response to determination that the one or more criteria are satisfied, a first portion of the gaming data to retain on the NVRAM;
delete, after determination of the first portion of the gaming data to retain, a second portion of the gaming data without deletion of the first portion of the gaming data; and boot a game of the gaming machine to a default operational state using at least some of the first portion of the gaming data.

* * * * *